Patented Dec. 13, 1927.

1,652,349

UNITED STATES PATENT OFFICE.

CHARLES JOSEPH ALEXANDER COULSHAW, OF LONDON, ENGLAND, ASSIGNOR TO ROBERT ARKELL, OF LONDON, ENGLAND.

METHOD OR PROCESS OF SEASONING AND MATURING BRUYÈRE-WOOD TOBACCO PIPES.

No Drawing. Application filed February 5, 1926, Serial No. 86,345, and in Great Britain February 19, 1925.

This invention relates to a method or process of seasoning and maturing bruyère wood tobacco pipes, with a view to rendering such pipes sweet smoking and cool from the commencement of use.

According to the invention, the pipe bowl after having been heated in a low temperature oven to dry out the natural oils in the wood, is immersed in hot rum, or other suitable alcoholic liquor, and left therein until the whole has cooled down. The rum, or other suitable alcoholic liquor, is preferably heated to within a few degrees of boiling point.

Preferably the process is carried out as follows:—

After heating the bowl in a low temperature oven as set forth above, it is laid in dry bran or sawdust to absorb any natural oils driven to the surface, then immersed in the hot rum, or other suitable alcoholic liquor, and left therein until the whole is cool, when the bowl is removed from the alcoholic liquor, wiped over with sweet oil and finally dried out for several weeks in a cool room or chamber.

Although I prefer to employ rum, other suitable alcoholic liquors, such as whisky, brandy, or spirits of wine, may be substituted. Alcoholic liquors having a nauseous flavour, e. g., wood spirit and methylated spirit, would of course be quite unsuitable. The percentage of alcohol in the liquor should not be less than is found in ordinary commercial potable spirituous liquor.

I claim:—

1. The process of seasoning and maturing bruyère wood tobacco pipes, consisting in heating the bowl to dry out the natural oils, then immersing the bowl in alcoholic liquor, and subsequently drying the bowl.

2. The process of seasoning and maturing bruyère wood tobacco pipes, consisting in heating the bowl in a low temperature, then immersing the bowl in hot alcoholic liquor and leaving it in same until the whole has cooled down.

3. The process of seasoning and maturing bruyère wood tobacco pipes, consisting in heating the bowl, in then placing the heated bowl in a dry absorbent material, in subsequently immersing the bowl in alcoholic liquor, and finally in submitting the bowl to slow drying.

4. The process of seasoning and maturing bruyère wood tobacco pipes, consisting in heating the bowl in a low temperature, in placing the heated bowl in dry absorbent material, in immersing the bowl in a hot alcoholic liquor, in wiping the bowl over with sweet oil, and finally in submitting the bowl to slow drying.

CHARLES JOSEPH ALEXANDER COULSHAW.